US011625555B1

(12) United States Patent
Zhiyanov et al.

(10) Patent No.: US 11,625,555 B1
(45) Date of Patent: Apr. 11, 2023

(54) ARTIFICIAL INTELLIGENCE SYSTEM WITH UNSUPERVISED MODEL TRAINING FOR ENTITY-PAIR RELATIONSHIP ANALYSIS

(71) Applicant: Amazon Technologies, Inc., Seattle, WA (US)

(72) Inventors: Dmitry Vladimir Zhiyanov, Redmond, WA (US); Lichao Wang, Seattle, WA (US); Archiman Dutta, Shoreline, WA (US)

(73) Assignee: Amazon Technologies, Inc., Seattle, WA (US)

( * ) Notice: Subject to any disclaimer, the term of this patent is extended or adjusted under 35 U.S.C. 154(b) by 469 days.

(21) Appl. No.: 16/817,218

(22) Filed: Mar. 12, 2020

(51) Int. Cl.
*G06K 9/62* (2022.01)
*G06N 3/049* (2023.01)

(52) U.S. Cl.
CPC ......... *G06K 9/6257* (2013.01); *G06K 9/6215* (2013.01); *G06K 9/6228* (2013.01); *G06K 9/6282* (2013.01); *G06N 3/049* (2013.01)

(58) Field of Classification Search
CPC .. G06K 9/6257; G06K 9/6215; G06K 9/6228; G06K 9/6282; G06N 3/049
See application file for complete search history.

(56) References Cited

U.S. PATENT DOCUMENTS

| 6,169,969 | B1 | 1/2001 | Cohen | |
|---|---|---|---|---|
| 6,327,561 | B1 | 12/2001 | Smith et al. | |
| 6,363,381 | B1 | 3/2002 | Lee et al. | |
| 6,697,998 | B1 | 2/2004 | Damerau et al. | |
| 7,644,127 | B2 | 1/2010 | Yu | |
| 7,912,705 | B2 | 3/2011 | Wasson et al. | |
| 10,339,470 | B1* | 7/2019 | Dutta | G06N 20/20 |
| 10,565,498 | B1 | 2/2020 | Zhiyanov | |
| 11,232,358 | B1* | 1/2022 | Ramezani | G06N 3/084 |
| 11,436,532 | B2* | 9/2022 | Lu | G06F 16/2365 |
| 2014/0279739 | A1* | 9/2014 | Elkington | G06N 20/00 706/12 |
| 2016/0147780 | A1* | 5/2016 | Zhiyanov | G06F 16/9537 707/706 |
| 2016/0357790 | A1* | 12/2016 | Elkington | G06F 16/215 |
| 2017/0315984 | A1* | 11/2017 | Goyal | G06F 40/30 |
| 2019/0287025 | A1* | 9/2019 | Perez | G06N 20/20 |
| 2019/0370695 | A1* | 12/2019 | Chandwani | G06K 9/6262 |
| 2020/0364243 | A1* | 11/2020 | Tamayo-Rios | G06F 16/2458 |
| 2020/0379868 | A1* | 12/2020 | Dherange | G06F 11/3438 |
| 2021/0042472 | A1* | 2/2021 | Nishida | G06F 16/00 |
| 2021/0081612 | A1* | 3/2021 | Saito | G06K 9/6256 |
| 2021/0294975 | A1* | 9/2021 | Xu | G06F 40/284 |

(Continued)

OTHER PUBLICATIONS

Author Unknown, "Decision Tree Learning", Wikipedia, Old Revision dated Feb. 13, 2020 (Year: 2020).*

(Continued)

*Primary Examiner* — Aaron W Carter
(74) *Attorney, Agent, or Firm* — Robert C. Kowert; Kowert, Hood, Munyon, Rankin & Goetzel, P.C.

(57) ABSTRACT

Respective labels are generated automatically for a plurality of record pairs, with a label for a given pair indicating a relationship detected between the records of the pair. One or more machine learning models are trained using the labeled record pairs. The trained versions of the models are stored.

20 Claims, 10 Drawing Sheets

(56) References Cited

U.S. PATENT DOCUMENTS

2021/0303783 A1* 9/2021 Misra ............... G06F 40/44
2021/0374525 A1* 12/2021 Bremer ............ G06K 9/6272

OTHER PUBLICATIONS

Jane Bromley, et al., "Signature Verification using a "Siamese" Time Delay Neural Network", AT&T Bell Laboratories, 1994, pp. 737-744.

Oriol Vinyals, et al., "Matching Networks for One Shot Learning", In Advances in Neural Information Processing Systems, 2016, pp. 1-12.

Jordan Burgess, et al., "One-Shot Learning in Discriminative Neural Networks", Workshop on Bayesian Deep Learning, NIPS 2016, pp. 1-3.

Anonymous, "Classification—TensorFlow", Retrieved from URL: https://www.tensorflow.org/versions/r0.10/api_docs/python/nn/classification#tsigmoid_cross_entropy_with_logits on Feb. 15, 2017, pp. 1-5.

Wikipedia, "Keras", Retrieved from URL: https://en.wikipedia.org/wiki/Keras on Feb. 15, 2017, pp. 1-2.

Amazon Web Services, "Amazon Machine Learning—Developer Guide Version Latest", Updated Aug. 2, 2016, pp. 1-146.

Gregory Koch, et al., "Siamese Neural Networks for One-shot Image Recognition", In Proceeding of the 32nd International Conference on Machine Learning, JMLR: W &CP vol. 37, 2015, pp. 1-8.

Colah's Blog, "Understanding LSTM Networks", Posted on Aug. 27, 2015, pp. 1-22.

Sergei Dobroshinksy et al., "Integrate and deduplicate datasets using AWS Lake Formation FindMatches", AWS Big Data Blog, Retrieved from https://aws.amazon.com/blogs/big-data/integrate-and-deduplicate-datasets-using-aws-lake-formation-findmatches/, Feb. 5, 2020, pp. 1-24.

Russell Reas et al., "SuperPart: Supervised graph partitioning for record linkage", The 44th International Conference on the Very Large Data Bases, Proceedings of the VLDB Endowment, vol. 11, No. 5, Aug. 2018, pp. 1-10.

* cited by examiner

ARTIFICIAL INTELLIGENCE SYSTEM WITH UNSUPERVISED MODEL TRAINING FOR ENTITY-PAIR RELATIONSHIP ANALYSIS

BACKGROUND

Records for many kinds of large-scale business applications are often stored in electronic form. For example, a global electronic retailer may use electronic records containing text as well as non-text attributes to store information about millions of items that are available for sale, and publish at least some portions of the item descriptions contained in the electronic records to enable customers to select and purchase the items. Similarly, a large medical organization may store medical records for millions of customers. Although some organizations may attempt to standardize the manner in which information about entities is stored internally, such standardized approaches may not always succeed. For example, in environments in which a variety of vendors or product suppliers sell their items through a common re-seller, different vendors may use respective approaches towards describing items. Furthermore, the standardization approaches may differ from one organization to another, which may for example make it somewhat difficult to determine whether an item description at one e-retail web site is necessarily referring to the same item as another differently-formatted item description at another web site.

The ability to resolve entity information-related ambiguities (such as slightly different descriptions of the same entities, or very similar descriptions of distinct entities) may be extremely important for many organizations. For example, consider a scenario in which the same product is being sold on behalf of several different product suppliers via a particular retailing web-site, at which for each available product, a "details" web page is made available to potential customer. If different details pages are provided, based on the differences in the way that the product suppliers describe their product, this may lead to customer confusion, lowered customer satisfaction or even lower sales than may have been achieved had the products been clearly and unambiguously identified as being identical. Resolving such ambiguities, given various natural-language descriptions of items originating at different sources, may present a non-trivial technical challenge, especially in environments in which the item catalog or inventory size is extremely large and tends to change rapidly. Obtaining sufficient labeled data for training machine learning models to address such problems can be labor-intensive.

Figure 1:
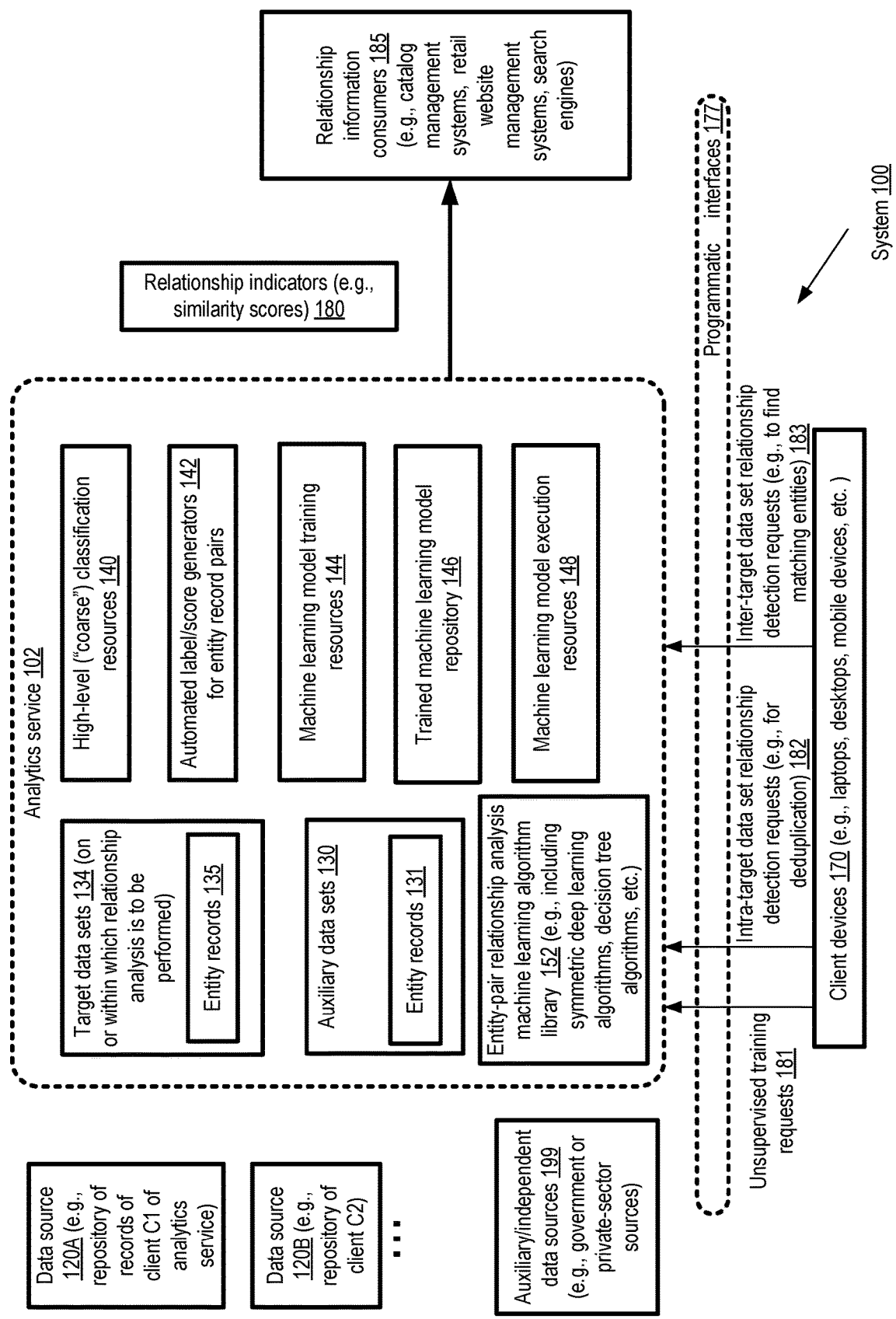
FIG. 1 illustrates an example system environment in which the analysis of relationships among entities may be performed in an unsupervised manner using machine learning models whose training data is labeled automatically, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

The present disclosure relates to methods and apparatus for unsupervised training of machine learning models for performing relationship analysis, such as similarity analysis, on data sets containing information on the attributes of various entities. In order to train machine learning models, input data usually has to be labeled by humans. Generating sufficient amounts of labeled data can be labor intensive and potentially error-prone, especially for some types of machine learning models such as deep neural network-based models which require large amounts of training data, and often takes up a significant part of the overall time taken to develop the machine learning models. The proposed technique, in contrast, does not require manual labeling, thus reducing the overall time taken to obtain relationship analysis results of a high quality. Furthermore, instead of generating a single machine learning model for relationship analysis with respect to a target collection of diverse records, several machine learning models are automatically generated (potentially in parallel), which each such model focused on a particular class of records of the collection. Because such class-specific models do not have to be as general as a single global model would, training of the class-specific models may be completed more quickly, and the class-specific models may often be more accurate than a global model at predicting/detecting relationships. The automated processes used to generate training data and utilize the training data to generate a set of machine learning models which can then be used to detect similarities and/or other relationships among entities of one or more target data sets may be referred to as being "unsupervised" herein, as they do not require manual control or supervision in various embodiments.

At a high level, the proposed techniques may be summarized as follows. With respect to a given target data set containing records representing entities whose relationships are to be analyzed (e.g., with respect to other entities of the same target data set, or with respect to entities which are not part of the target data set), a set of top-level entity classes may first be identified in various embodiments. Relatively coarse classification factors such as the countries of origin or residence of the entities, the source organizations or producers of the entities, and so on, may be used in this preliminary classification step in some embodiments, with the exact factors being dependent on the domain of the problem being addressed. With respect to at least some of the top-level classes into which the target data set entity records are categorized, a respective auxiliary data source (or a set of auxiliary data sources) may be identified. For example, if the entities of the target data set represent items of an electronics items catalog of an e-retail web site, the top-level classes may correspond to the manufacturers of the electronics items, and the auxiliary data sources may comprise the public web sites of the respective manufacturers. In at least some cases, the auxiliary data sources may contain more complete and/or more authoritative data about at least some of the entities than may be available in the target data set. For example, the target data set may be derived from information provided to an e-retail web site by various sellers of electronics items in some embodiments, and such information may not be as comprehensive and error-free as information obtained from the manufacturers of the items.

Using a plurality of data sources including the auxiliary data source and at least one other data source (which could be the target data set itself, or contributor records which were reconciled/standardized to obtain the target data set), a respective collection of candidate record pairs for inclusion in a training data set for a given top-level class may be obtained in various embodiments. One member of each record pair may, for example, be obtained from an auxiliary data source, while the other member may be obtained from the target data set. Respective labels indicative of relationships which can be detected between the members of each pair may then be generated automatically in at least some embodiments, e.g., using an entity-pair comparison algorithm which does not utilize machine learning. At least a subset of the labeled record pairs generated for each top-level class may then be used to train a respective per-class machine learning model for relationship analysis in various embodiments. In some cases, the model may comprise one or more deep neural networks; in other cases, decision tree based models or other types of models may be used. By eliminating the need for manual labeling, considerable time may be saved in various embodiments. A trained version of each of the per-class models may be stored, and used to predict or infer the extent of the relationships between various pairs of entities as needed in some embodiments. For example, the trained per-class models may be used to identify duplicates within a given target data set, or to find closely matching (or highly dissimilar) entities within two different data sets, and so on. Because the analysis is performed on a per-top-level-class basis, as mentioned earlier, the machine learning models may not have to be as general as they would have been if relationship analysis with respect to all the classes had to be performed using a single model.

To simplify the presentation, similarity analysis is used as the primary example of relationship analysis in much of the following description. In similarity analysis, a respective similarity score (e.g., a real number between 0 and 1) may be generated for a given entity pair, with a higher score indicating a greater similarity than a lower score in at least some embodiments. However, the unsupervised training techniques described herein may be employed with equal success for other types of relationships in various embodiments. Other types of relationship indicators generated in various embodiments without supervision may include, for example, inclusion scores or participation scores. For example, if one of the entities of a pair being analyzed is an individual item and the other entity represents a group of items such as a brand or category, an inclusion score may indicate the probability that the item has the indicated brand or belongs to the indicated category. A participation score may indicate, for example, a probability that one entity (e.g., an actor) participated in or was involved in an activity represented by the other entity (e.g., a motion picture).

As one skilled in the art will appreciate in light of this disclosure, certain embodiments may be capable of achieving various advantages, including some or all of the following: (a) reducing the overall amount of time and computing resources, including processors, memory, and the like, needed to develop high-quality machine learning models for similarity analysis and other types of relationship analysis; (b) improving the user experience of data scientists and other users of analytics services, e.g., by reducing the number of interactions needed with the analytics service, and/or (c) enhancing the security of data sets which may potentially comprise sensitive information, by eliminating the need for human labelers to examine such data sets.

According to some embodiments, a system may comprise one or more computing devices (e.g., of an analytics service of a provider network or cloud computing environment). The devices may include instructions that upon execution on or across one or more processors cause the one or more computing devices to determine that similarity analysis (or some other type of relationship analysis) is to be performed with respect to a target collection of records. Each of the records of the target collection may comprise respective values of one or more attributes of an entity in some embodiments. The target collection may be classified into a plurality of subsets in various embodiments, with each of the subsets representing a respective top-level class (TLC) of a set of top-level classes identified for the target data set. With respect to at least some TLCs to which the target data set records have been mapped, an indication of one or more auxiliary/additional data sources (other than the target record collection itself) for entities of the TLC may be obtained, e.g., via programmatic interfaces of the analytics service in some embodiments. Using the additional data sources and an entity-pair comparison algorithm, respective labels for a plurality of record pairs of a training data set to be used to train a supervised machine learning model for relationship analysis may be generated automatically in various embodiments. The entity-pair comparison algorithm may not utilize a machine learning model or algorithm in at least some embodiments; instead, for example, a deterministic token matching algorithm (which computes, using binary maps or other similar data structures, how many tokens in one or more attributes of a record are also present in attributes of the other records of a record pair) may be used in one embodiment.

Using the respective auto-generated training data sets for various TLCs, one or more relationship analysis machine learning models may be trained for each TLC in some embodiments. The trained versions of the models may be stored. Using the trained versions, indications of relationships (such as similarity scores, inclusion scores, participation scores, etc.) may be generated for various pairs of records in different embodiments—e.g., for pairs which contain two records of the target collection itself, or for pairs which contain at least one record which is not part of the target collection. For example, pairs of records within the target collection which satisfy a high-similarity criterion (such as a similarity score greater than 0.9 on a scale of 0 to 1) may be identified to remove duplicates, or records from different data sets which satisfy a high-similarity criteria may be identified and tagged as probably referring to the same entity.

In some embodiments, one or more data transformation or data cleansing tasks may be performed to obtain the records of the target data collection. For example, raw records from a number of sources, referred to as contributor records, may first be obtained, and the raw records may be standardized, reconciled or normalized to generate the target data set. In at least one embodiment, at least some of the record pairs for which labels are auto-generated may comprise one such contributor record and one record obtained from an auxiliary or additional data source. In other embodiments, at least some of the record pairs for which labels are auto-generated may comprise a record of the target collection (e.g., a record obtained after the standardization/reconciliation operations are applied to raw contributor records) and one record obtained from the additional data source.

In at least one embodiment, depending on the sizes of the contributor record sets, the target collections, and/or the auxiliary data sets obtained from the auxiliary data sources, a sampling technique may be used to identify candidate records for inclusion in the record pairs of the training set. For example, random sampling may be used, or sampling based on the completeness/incompleteness of the records (e.g., rejecting records which have null or invalid values for some attributes), attribute range coverage based sampling (e.g., ensuring that the values of the attributes of the retained records cover a reasonable subset of the expected range of the values), and other similar techniques may be used to reduce the size of the training data set for a given TLC in different embodiments. In other embodiments, the candidate record pairs for which relationship scores are obtained for possible inclusion of the record pairs in the training data set may comprise a cross-product or full/Cartesian join of (a) all the records available from the auxiliary data source for the TLC, and (b) all the records of the target collection (or contributor records of the target collection).

According to some embodiments, binary maps may be generated for one or more attributes of the record pairs being considered as potential candidates for inclusion in the training data sets, and such binary maps may be used to generate the labels. The binary maps may indicate the presence (or absence) of one or more text tokens in the entity attributes of the records, and the extent of the overlap between the binary maps for a given pair of records may be used to determine the label for that pair in some implementations. In some embodiments, the entity pair comparison algorithm used to generate labels may initially generate scores (e.g., similarity scores) within a numerical range. Those numerical scores may be mapped using thresholds to a set of discrete labels such as "HIGH-SIMILARITY" (e.g., for similarity scores above a threshold T1), "HIGH-DISSIMILARITY" (e.g., for similarity scores below a second threshold T2) or "INTERMEDIATE" (e.g., for similarity scores which are between T2 and T1). Some of the record pairs (such as the ones labeled "INTERMEDIATE") may not be included in the training data set in at least some embodiments. In at least some embodiments, the number of "HIGH-SIMILARITY" record pairs included in the training data set may be limited—e.g., only one pair with the highest similarity score may be retained.

A wide variety of machine learning models may be trained using the automatically labeled record pairs in different embodiments. In some embodiments, the models may comprise one or more LSTM (Long Short Term Memory) modules and/or one or more convolutional neural network (CNN) layers. In at least one embodiment, a machine learning model which does not use neural networks may be trained using the automatically labeled record pairs—e.g., a decision-tree based model may be trained.

An analytics service which supports the unsupervised training technique introduced above may implement a set of programmatic interfaces in some embodiments, which can be used by clients to submit requests for the training and execution of the machine learning models. Such programmatic interfaces may include, among others, web-based consoles, application programmatic interfaces (APIs), command-line tools, graphical user interfaces and the like. Clients may use such interfaces to specify the target collection of records, contributor records, auxiliary data sets, top-level classes for which respective machine learning models are to be trained using automatically-labeled training data, and so on, in different embodiments.

EXAMPLE SYSTEM ENVIRONMENT

FIG. 1 illustrates an example system environment in which the analysis of relationships among entities may be performed in an unsupervised manner using machine learning models whose training data is labeled automatically, according to at least some embodiments. As shown, system 100 comprises resources and artifacts of an analytics service 102 at which relationship analysis may be performed with respect to a variety of records (with each record containing respective values for one or more attributes of an entity) from several different data sources in the depicted embodiment. Data sources 120A and 120B may, for example, each contain a respective collection of records of a client of the analytics service—e.g., records of a client C1 may be stored at data source 120A, while records of a different client C2 may be stored at a different data source 120B. Target data sets 134 comprising entity records for which relationship analysis is to be performed at the analytics service 102 may be constructed from or derived from such data sources 120. In some cases, the construction of such target data sets 130 may include data cleansing, reconciliation, transformation or standardization/normalization operations on raw data records of the data sources 120. Entity pair relationship information generated at, and provided by, the analytics service may in some cases involve entity records 135 of a given target data set (e.g., in scenarios in which duplicate records are to be identified from within a collection of records), and in some cases may involve entity records 135 of distinct target data sets (as, for example, when the closest match to a given entity of one data set which can be found in a different data set is to be identified).

The analytics service 102 may implement one or more programmatic interfaces 177 in the depicted embodiment, which may be used by clients of the analytics service to submit messages of various types from client devices 180 (e.g., desktops, laptops. Mobile computing devices etc.) and receive corresponding responses from the analytics service. Programmatic interfaces 177 may include, among others, web-based consoles, APIs, command-line tools and/or graphical user interfaces in different embodiments. In at least some embodiments, a client may trigger a workflow for automated training of machine learning models, including auto-generation of labels for a training data set used for the models, by submitting one or more unsupervised training requests 181. The analytics service 102 may be referred to as a machine learning service in some embodiments, and system 100 may be referred to as an artificial intelligence system or a machine learning system.

At least some training data sets for one or more types of relationship analysis machine learning algorithms, such as various algorithms of a library 152, may be generated with the help of one or more auxiliary or independent data sources 199 at the analytics service 102 in the depicted embodiment. In some cases, such auxiliary data sources 199 may comprise government databases, public web sites of various organizations within industries of interest, data sets made accessible by private-sector authorities or consortia, and so on. In at least some embodiments, a client of the analytics service may provide indications of the auxiliary data sources 199 relevant to a particular target data set 134 via programmatic interfaces 177. Information about entities relevant to a given relationship analysis task may be extracted from the independent data sources 199, and used to generate entity records 131 of auxiliary data sets 130 in at least some embodiments at the analytics service 102. In some cases, the construction of such auxiliary data sets 134 may include data cleansing, reconciliation, transformation or standardization/normalization operations, similar to those which may be used to generate the target data sets 134. At least some auxiliary data sets 130 may be assigned a higher level of trust by the clients of the analytics service than is assigned to the target data sources 120, e.g., based on the reputations of the institutions or organizations from which the auxiliary data sets are obtained. For example, with respect to records pertaining to electronics items, records made publicly available by a manufacturer may be considered more reliable or complete than records obtained from other sources describing the same items, as the latter may not have been curated as thoroughly and hence may contain more "noise" (e.g., potentially incomplete/erroneous values of attributes, or approximate rather than exact values). In some embodiments, a client of the analytics service may designate one or more auxiliary data sources 199 as highly-trusted or authoritative. Note that the extent of trust placed by a client in an auxiliary data source 199 may not play a role in the implementation of the unsupervised training procedure in at least some embodiments.

In at least some embodiments, the analytics service 102 may include a set of high-level or coarse classification resources 140 used in a preliminary phase of the workflow for automated training of the relationship analysis models. Such resources may be utilized to divide the records of a given target data set 134 into subsets, with the members of each subset representing examples of one of a set of top-level classes (TLCs) identified for the data set. The term "top-level" may be used to refer to such classes in at least some embodiments because the relationship analysis results produced by the algorithms of library 152 may themselves be used to cluster or classify the records of one or more such classes into finer-granularity sub-classes, and the finer-granularity classes may be referred to as "lower-level" classes. Any of a number of techniques may be used to identify the set of TLCs to which records of a target data set 135 are mapped. For example, in some embodiments, a client of the analytics service may provide a set of TLCs for a given relationship analysis problem or target data set. In other cases, the analytics service may use one of (or a few of) the attributes of the records of a target data set 134 to identify possible TLCs—e.g., an "address" attribute may be used to classify records of people by countries or states of residence, or a "manufacturer" attribute may be used to classify records of manufactured goods. In some embodiments, a client of the analytics service may provide a list of auxiliary data sources 199 to the analytics service, which can collectively be used to obtain additional information about at least some of the entities represented in a target data set, and a respective TLC may be identified corresponding to each of the auxiliary data sources. Thus, if a client indicates that information about the entities of a target data set TDS1 can be obtained from auxiliary data source ADS1, ADS2 and ADS3, the records of TDS1 may be subdivided into at least three TLCs, one per auxiliary data source. In some embodiments, the subsets into which the records of the target data set are mapped may be non-overlapping; in other embodiments, overlaps may exist, i.e., a given record of a target data set may be mapped to more than one TLC.

For each of the TLCs and corresponding subsets of the target data set 134, a respective training data set may be automatically generated and labeled in the depicted embodiment, e.g., with the help of one or more automated label/score generators 142. Each training data record may comprise a pair of records in various embodiments, of which at one is from an auxiliary data set 130 while the other is from the target data set 134 (or is a raw or contributor record from a data source which was used to obtain the target data set). The task of generating training data set for a given TLC may itself comprise two lower-level tasks in some embodiments: the identification/selection of pairs of records, and then the labeling of the identified pairs. In some cases, for example, sampling techniques may be used to select records from each of the source data sets involved (e.g., the auxiliary and target data sets) for possible inclusion in the training data, such that labeling does not have to be performed for all possible pairs of records from the two source data sets. Random sampling may be used in some implementations. Content-based sampling, in which the completeness/incompleteness of the records' attribute values, or the ranges of the attribute values are taken into account when selecting a record for possible inclusion in the training data, may be used in other implementations. The label generated for a record pair may comprise a relationship indicator or score, such as a similarity indicator in some embodiments. The labels for the record pairs may be generated using a relatively simple, fast and easy-to-implement deterministic entity-pair comparison algorithm in the depicted embodiment. In at least some embodiments, the labels may be generated using pattern matching or token matching algorithms, which do not require machine learning; in other embodiments, machine learning may be used. In some implementations in which at least some attributes of the records of the data sets 130 and 134 include text tokens, binary maps of the text tokens may be generated from the respective attribute values of both records of a record pair, and the overlaps in the binary maps may then be computed to assign a relationship score for the record pair. Additional details regarding the automated labeling procedures used in various embodiments are provided below, e.g., in the context of FIG. 4 and FIG. 5.

Using the training data sets generated and labeled automatically for the respective TLCs, a respective machine learning model for each TLC may be trained at training resources 144 in the depicted embodiment. Any of a wide variety of machine learning algorithms of a library 152 of the analytics service 102 may be used in different embodiments, e.g., including decision-tree based algorithms, deep learning based algorithms which utilize LSTMs or CNN layers, and so on. In some embodiments, a client may specify a preferred type of algorithm to be used for the models via programmatic interfaces 177. In at least one embodiment, a different model type or algorithm may be used for one TLC than is used for another—e.g., for TLC1, an LSTM-based machine learning model may be trained, while for TLC2, a CNN-based algorithm may be used. In some embodiments, an ensemble approach may be used, in which multiple models may be trained for at least some TLCs, each implementing a different algorithm and/or each using a different set of hyper-parameters. The model training resources 144 may select which particular algorithm should be used for which TLCs in one embodiment, e.g., based at least in part on the size and/or quality of the training data auto-generated for a given TLC.

After the models for the different TLCS have been trained, they may be stored at a repository 146 in some embodiments. A client of the analytics service may submit at least two different types of requests to utilize the trained models in the depicted embodiment. Requests 182 may be submitted for relationship analysis within a given target data set—e.g., a client may request the logical equivalents of "remove all duplicate records from target data set TDS1" or "is there another record in target data set TDS1 whose similarity score with respect to record R1 of TDS1 is greater than X?". Requests 183 may be submitted for inter-target data set relationship detection—e.g., the logical equivalents of "find the 10 closest matches, within target data set TDS2, to record R1 of target data set TDS1". In response to requests 182 and/or 183, the trained versions of one or more TLC-specific models may be run, e.g., using execution resources 148 of the analytics service 102. The relationship indicators 180 produced by the trained model(s) may be provided, e.g., to the requesting clients and/or to one or more relationship information consumer systems 185. Automated programs that consume relationship information such as similarity scores may include catalog management systems, e-retail website management systems, search engines and the like in different embodiments. The relationship information provided by the analytics service may be used at such downstream systems to, for example, remove or combine redundant entries from catalogs, provide better search results, organize e-retail web site item hierarchies, and so on.

Example Class-Specific Operations

Figure 2:
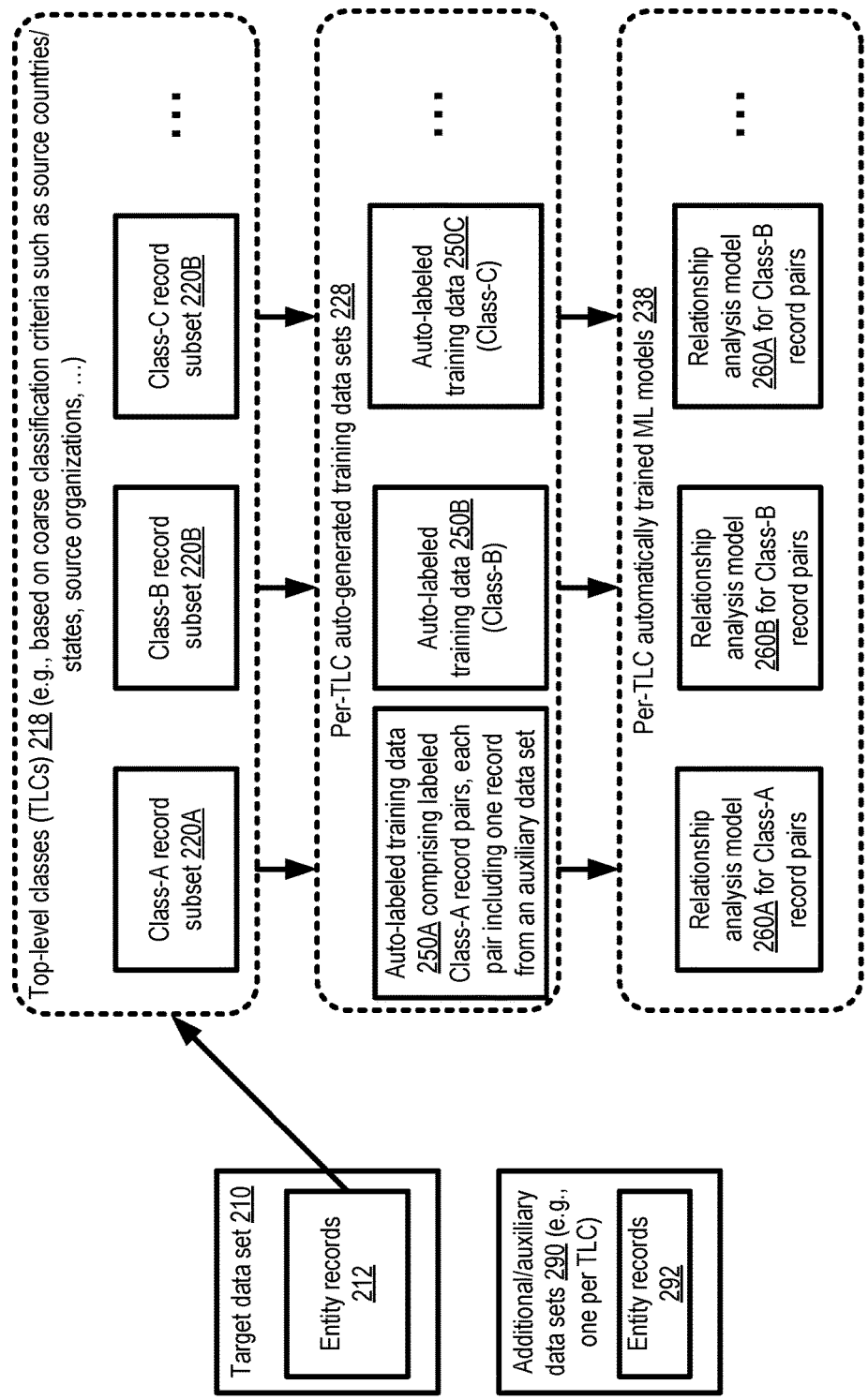
FIG. 2 illustrates an overview of class-specific training data set generation and class-specific model training, according to at least some embodiments.

As indicated above, in various embodiments, data sets for relationship analysis may be divided into subsets based on high-level classification, and then respective separate models may be trained for at least some of the classes. FIG. 2 illustrates an overview of class-specific training data set generation and class-specific model training, according to at least some embodiments.

In the depicted embodiment, two types of data sets are available: a target data set 210, comprising entity records 212 for which relationship analysis is eventually to be performed using machine learning model(s), and one or more additional or auxiliary data sets 290, containing entity records 292. Individual records 212 and 292 may comprise values for at least some attributes of the corresponding entities, such as "entity name", "entity description", and so on. The set of attributes of the records 212 may not necessarily match the set of attributes of records 292 in some embodiments. At least some of the entities represented by entity records 292 may also be represented by one or more records 212 in the depicted embodiment. In some embodiments, a respective auxiliary data set 290 corresponding to each of a plurality of top-level classes identified at the analytics service for the target data set 210 may be obtained, e.g., using records extracted from respective alternative data sources.

The records of the target data set may be categorized into a set of TLCs 218 at the analytics service in at least some embodiments, e.g., using values or value ranges for at least some of the attributes or fields of the records. Subset 220A may comprise records of TLC Class-A, subset 220B may comprise records of TLC Class-B, subset 220C may comprise records of TLC Class-C, and so on. Note that the TLCs need not be mutually exclusive in at least some embodiments. In at least one embodiment, just as records of the target data set are grouped into a set of TLCs, records from a given auxiliary data set 290 may similarly be grouped into the same set of TLCs.

For at least some TLCs, a respective set of record pairs may be generated in various embodiments, in which one record of each pair is from an additional data set 290, and the other record of the pair is from the target data set. The record pairs identified for each TLC may then be labeled automatically, without human labelers, in the depicted embodiment, resulting in per-TLC auto-generated training data sets 228. Auto-labeled training data set 250A may, for example, comprise labeled Class-A record pairs; auto-labeled training data set 250B may comprise labeled Class-B record pairs, and auto-labeled training data set 250C may comprise labeled Class-C record pairs. Note that in some embodiments, the training data sets generated for one or more TLCs may require some human supervision (e.g., to select labels for some ambiguous or borderline cases), while the training data sets for other TLCs may be generated completely automatically; even in such embodiments, the burden of manual labeling may be substantially reduced relative to cases when all the labels have to be generated by human labelers.

After the training data sets 228 have been generated, they may be used to train a collection of per-TLC machine learning (ML) models 238 in the depicted embodiment. ML models 260A, 260B and 260C may, for example, be trained for analyzing relationships of Class-A record pairs, Class-B record-pairs, and Class-C record pairs respectively. The trained versions of the models may be stored and executed as needed in response to client requests.

Methods for Unsupervised Training of Relationship Analysis Models

Figure 3:
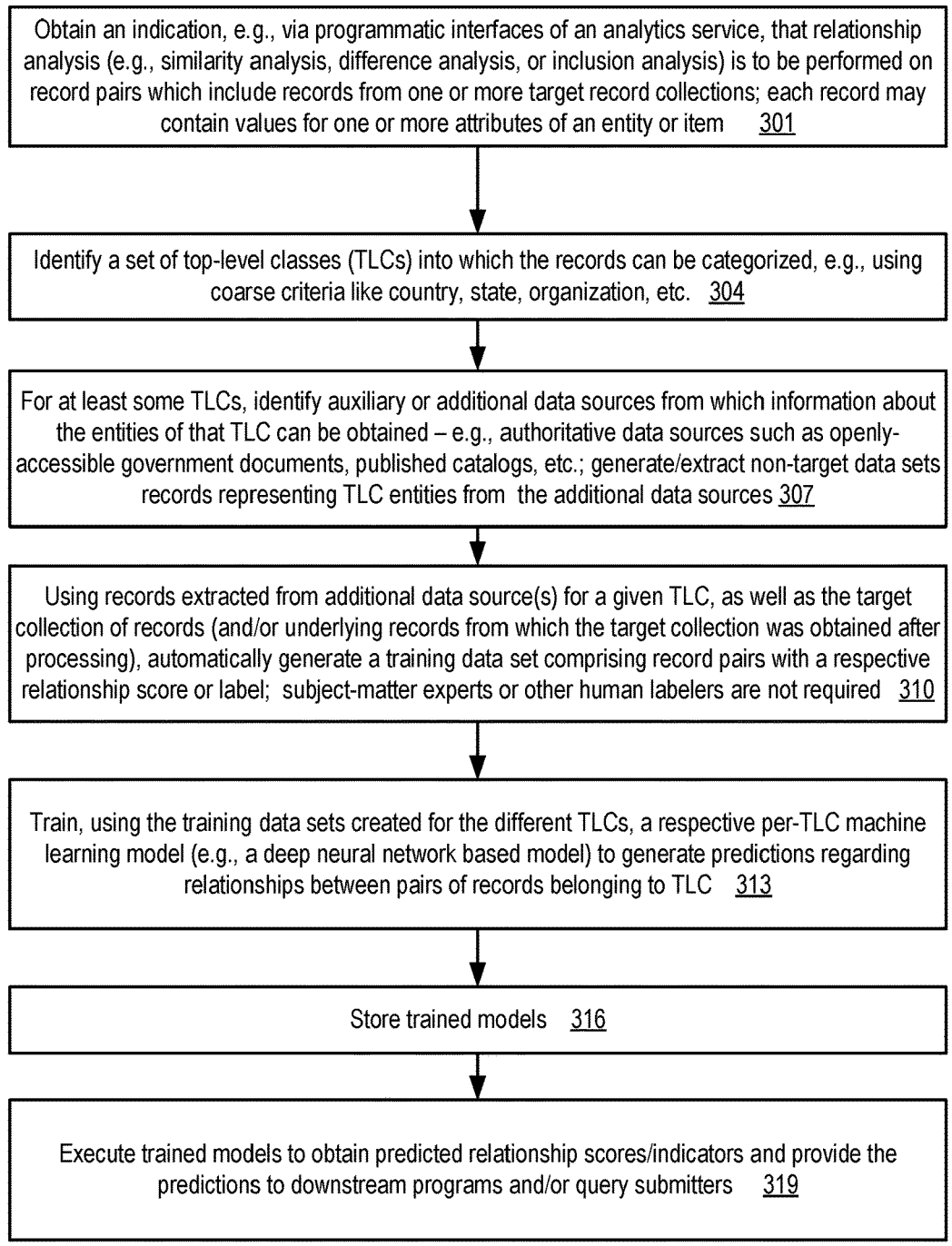
FIG. 3 is a flow diagram illustrating aspects of operations which may be performed to train and utilize relationship analysis machine learning models, according to at least some embodiments.

FIG. 3 is a flow diagram illustrating aspects of operations which may be performed to train and utilize relationship analysis machine learning models, according to at least some embodiments. As shown in element 301, an indication may be obtained that relationship analysis (e.g., similarity analysis, difference analysis, participation analysis, or inclusion analysis) is to be performed with respect to record pairs which include records from one or more target record collections. Each record may comprise values for one or more attributes of an entity or item in various embodiments. The attribute values may comprise instances of a variety of data types or object types in different embodiments, including for example text, images, audio, video and the like. In at least some embodiments the indication that relationship analysis is to be performed may be obtained via programmatic interfaces of an analytics service or artificial intelligence system.

A set of top-level classes (TLCs) into which the records of the target collections may be categorized may be identified in various embodiments (element 304). In some cases the clients on whose behalf the relationship analysis is to be performed may provide a list of TLCs via programmatic interfaces. In at least one embodiment, the analytics service at which the relationship analysis is performed may identify the TLCs itself, e.g., based on one or more coarse or high-level distinguishing attributes of the records, such as country, state, or organization of origin of the entities represented in the records. In some embodiments, a machine learning-based clustering algorithm may be used to classify the records of a target collection into TLCs. In at least some embodiments, a client of the analytics service may provide an indication of an algorithm (e.g., source code implementing the algorithm, or an executable program implementing the algorithm) to be used to classify the records into TLCs.

For at least some TLCs, one or more auxiliary/additional data sources from which information about the entities of that TLC may be identified (element 307). Such additional data sources may include, for example, authoritative or trusted data sources such as openly-accessible government or private sector documents, catalogs of items of various manufacturers, and so on. Respective data sets, e.g., each comprising a set of attribute values of entities of the TLCs, may be extracted/obtained from the auxiliary data sources. Such data sets may be referred to as non-target data sets (as relationship analysis is not expected to be performed among the records of the data sets), auxiliary data sets or additional data sets in various embodiments. The extraction of the non-target data sets may involve operations such as data cleansing, standardization, de-duplication, and the like in some embodiments, especially in cases where more than one auxiliary data source is available for a given TLC.

Using the records obtained from the additional data source(s) for a given TLC, as well as the target collection(s) of records, a training data set for a machine learning model to be used for relationship analysis may be generated automatically in various embodiments (element 310). The training data may comprise record pairs with associated relationship scores or labels computed without the assistance of subject-matter experts or any other type of human labelers in various embodiments. In at least some embodiments, an entity-pair token comparison algorithm may be used to generate the labels or scores. In some embodiments, one record of a given record pair of the training data set for a given TLC may be obtained from the auxiliary data sources, while the other record of the pair is obtained from the subset of the target collection for that TLC (or from underlying contributing sources for that TLC which were processed/cleansed to generate the target collection's records).

In some implementations, if there are N records of a given TLC available from an auxiliary data source, and there are M records of that TLC available in a target collection, respective relationship scores may be computed for all N×M combinations of record pairs, and a subset of the N×M pairs which satisfy threshold criteria for inclusion in the training data set (e.g., similarity scores above or below selected thresholds) may be retained, while the remaining pairs may be excluded from the training data set. In other implementations, especially in cases where N or M is very large, a sample of the auxiliary data set and/or a sample of the target collection may be obtained, and the candidate record pairs may be obtained from the selected sample(s). In some such implementations, random sampling may be used to limit the number of candidate record pairs. In other implementations, the completeness or incompleteness of the records may be used to select records for candidate record pairs (e.g., records which do not have valid values for one or more attributes, if any such records are present, may be rejected. In one implementation, if the range of values of a given attribute is known, records which collectively cover that range relatively uniformly may be selected for inclusion in the candidate record pairs. For example, if the value of a given attribute is expected to be in the range 1-100 in a target collection subset for a given TLC, and the distribution of that attribute is fairly uniform among the records of the target collection, the set of candidate records from that subset may be chosen such that the values of that attribute also vary approximately uniformly within the candidate records (with one or more candidate records with attribute values between 1-10 respectively, one or more with attribute values between 11-20, one or more with attribute values between 20-30 and so on.) In at least one embodiment, constraints or limits on the resources or time available for generating the training data set may influence the number of records analyzed for potential inclusion in the training data set—e.g., if an exhaustive pairwise comparisons of records could potentially require more CPU time than is available, only a subset of the available record pairs may be compared and further analysis may be terminated when the CPU budget is exhausted.

Using the training data sets prepared for the different TLCs, a respective per-TLC machine learning model may be trained in various embodiments to generate predictions regarding relationships between record pairs of a given TLC (element 313) in various embodiments. As a result of breaking down the overall modeling task into per-TLC modeling tasks, a number of technical benefits may be obtained in various embodiments. For example, the predictions of the per-TLC models may be more accurate than if a single global model were used, because a smaller and more specific set of salient characteristics of the entities may have to be learned in the per-TLC model than in a more general one. Secondly, the training data sets required to obtain high quality predictions may not have to be as large in the per-TLC case as in the single model case, and the training may therefore take less time and resources in the per-TLC case. Any of a wide variety of models may be used in different embodiments, including for example neural network models, decision tree based models, and so on. For each record pair, the model may generate respective relationship scores such as similarity scores, difference scores, inclusion scores, participation scores, and so on.

Trained versions of the per-TLC models may be stored, e.g., at a repository comprising persistent storage devices in various embodiments (element 316). The trained versions of the models may be run to obtain predicted relationship scores/indicators for specified record pairs (or for all possible record pairs of one or more target collections) as needed, and the predictions may be provided/transmitted to downstream programs and/or to the requesters who submitted queries which led to the execution of the trained models (element 319) in various embodiments.

Figure 4:
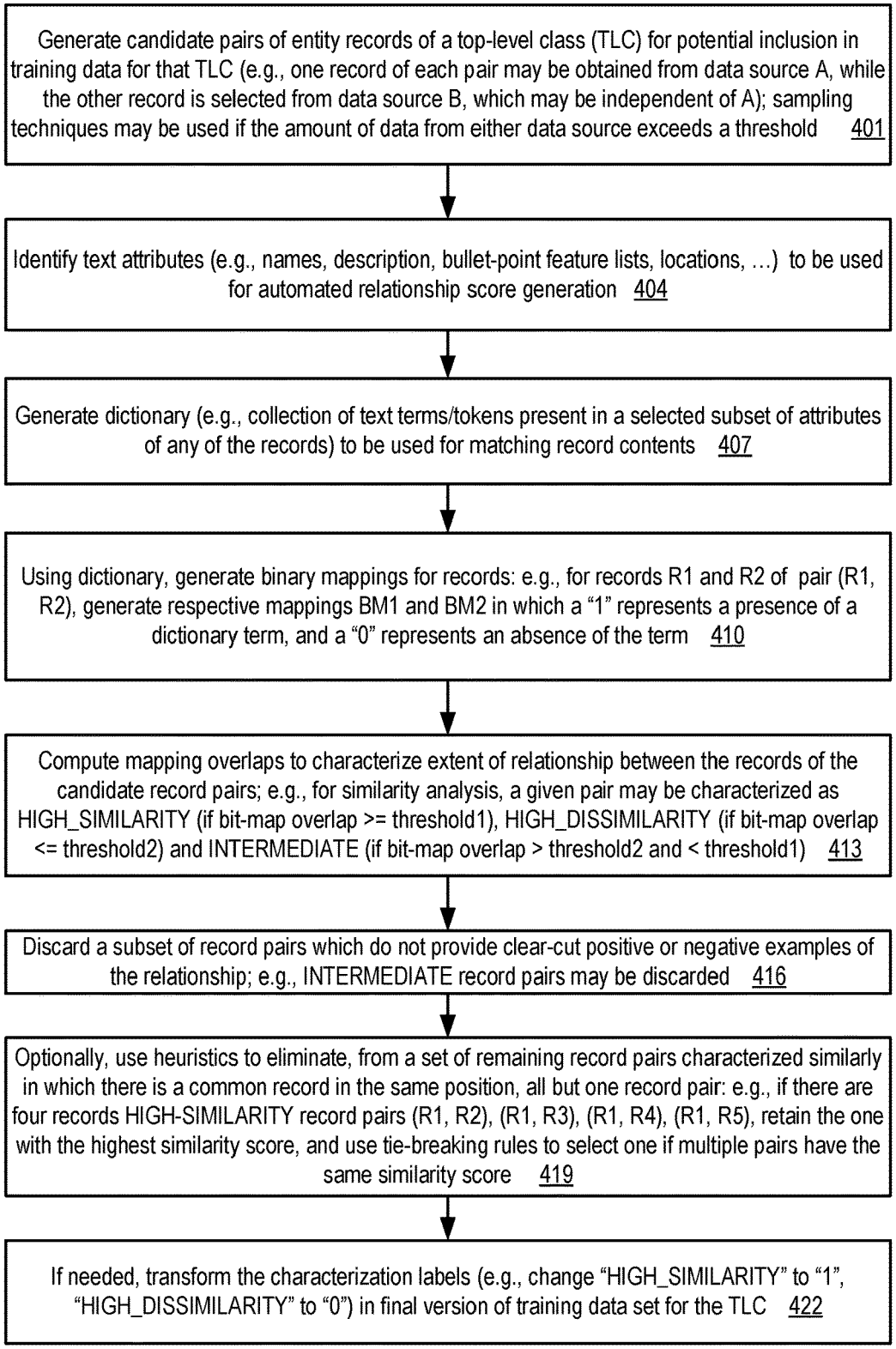
FIG. 4 is a flow diagram illustrating aspects of operations which may be performed to automatically generate labels for pairs of entity records, according to at least some embodiments.

FIG. 4 is a flow diagram illustrating aspects of operations which may be performed to automatically generate labels for pairs of entity records, according to at least some embodiments. As shown in element 401, candidate pairs of entity records of a given TLC may be generated for potential inclusion on training data for that TLC. One record of each pair may be selected from one data source A (e.g., an auxiliary data source of the kind discussed earlier), while the other may be selected from a different data source B (e.g. a target collection of records). If the sizes of the data available from A and/or B exceed a threshold, sampling techniques similar to those indicated earlier may be used to reduce the total number of candidate record pairs in at least some embodiments.

Each of the records of a given candidate record pair may comprise values of respective sets of attributes in various embodiments. For example, in a scenario in which relationship analysis is to be performed with respect to items of an e-retail catalog, each record may have "name" attribute, a "description" attribute, a "bullet-points feature list" attribute, and so on. In some embodiments, the set of attributes for which values are available may not necessarily be identical for both records of a given candidate record pair. In the embodiment depicted in FIG. 4, at least some of the attributes are assumed to comprise text tokens. A set of text attributes which are to be used for automated relationship score generation may be identified in the depicted embodiment (element 404).

A matching dictionary, comprising for example a collection of text terms or tokens that are collectively present in the selected attributes of any of the records of the candidate record pairs, may be generated in some embodiments (element 407). A simple example of such a dictionary is presented in FIG. 5, and the use of the dictionary is discussed below in further detail.

Using the dictionary, respective binary mappings may be created for the records of the candidate record pairs in at least some embodiments (element 410). For example, for record R1 of a record pair (R1, R2), a binary mapping BM1 may be created, in which a "1" represents the presence of a particular dictionary term in the attributes of R1, and a "0" represents the absence of a particular dictionary term. Similarly, a binary mapping BM2 may be created for R2.

Numerical representations of overlaps between the binary mappings (e.g., BM1 and BM2 in the above example) may be computed to characterize the extent of the relationship of interest between the records of each of the candidate record pairs (element 413). For example, in an embodiment in which similarity analysis is to be performed, the bit map overlap may be used as a similarity score, and a given record pair may be characterized as (a) HIGH_SIMILARITY if the bit-map overlap exceeds a threshold threshold1, (b) HIGH-DISSIMILARITY if the bit-map overlap is below a lower threshold threshold2, or (c) INTERMEDIATE if the bit-map is in neither of the ranges used for HIGH-SIMILARITY or HIGH_DISSIMILARITY classification.

In at least some embodiments, a subset of the candidate record pairs may be discarded/excluded at this stage, e.g., if they do not provide clear-cut positive or negative examples of the relationship under consideration (element 416). For example, in the similarity analysis example, INTERMEDIATE record pairs may be discarded.

Among the remaining record pairs, it may be the case that some pairs which have been characterized in the same way (e.g., HIGH_SIMILARITY) have a common record in the same position in the pairs. For example, there may be four HIGH_SIMILARITY pairs (R1, R2), (R1, R3), (R1, R4), and (R1, R5), all of which have R1 as the first member of the pair. In some embodiments, all such records may be retained in the training data set. In other embodiments, only one of such a group of common-record pairs may be retained in the training data set—e.g., the one which has the highest similarity score may be retained, while other pairs may be discarded. If there are multiple record pairs with the same relationship score in the group of common-record pairs, one or more tie-breaking rules may be used to select one. Note that such uniqueness may not be required or enforced with respect to all the characterization groups in at least some embodiments—e.g., while only a single HIGH_SIMILARITY record pair may be retained in the training data set in one implementation, multiple HIGH_DISSIMILARITY record pairs may be retained. The intuition behind enforcing the uniqueness requirement for HIGH_SIMILARITY record pairs may be based on assumptions about the comprehensiveness and accuracy of the data sources used for generating the candidate record pairs in some embodiments. For example, if a manufacturer's catalog (comprising records R2, R3, R4 and R5 in the above example) is assumed to be complete regarding items made by that manufacturer, and no duplicates are assumed to exist in the manufacturer's catalog, then it may be assumed that a single record (R1) cannot be equally similar to multiple records (R2, R3, R4 and R5) of the catalog, and so all but one of such record pairs may be eliminated to provide the best possible training record for the HIGH_SIMILARITY characterization.

In some embodiments, if needed, the characterization labels may be transformed in the final version of the training data set for the TLC (element 422). For example, HIGH_SIMILARITY labels may be transformed to "1" s, while HIGH-DISSIMILARITY labels may be transformed to "0" s.

It is noted that in various embodiments, some of the operations shown in FIG. 3 and/or in FIG. 4 may be implemented in a different order than that shown in the figure, or may be performed in parallel rather than sequentially. Additionally, some of the operations shown in FIG. 3 and/or FIG. 4 may not be required in one or more implementations.

Example Use of Binary Maps

Figure 5:
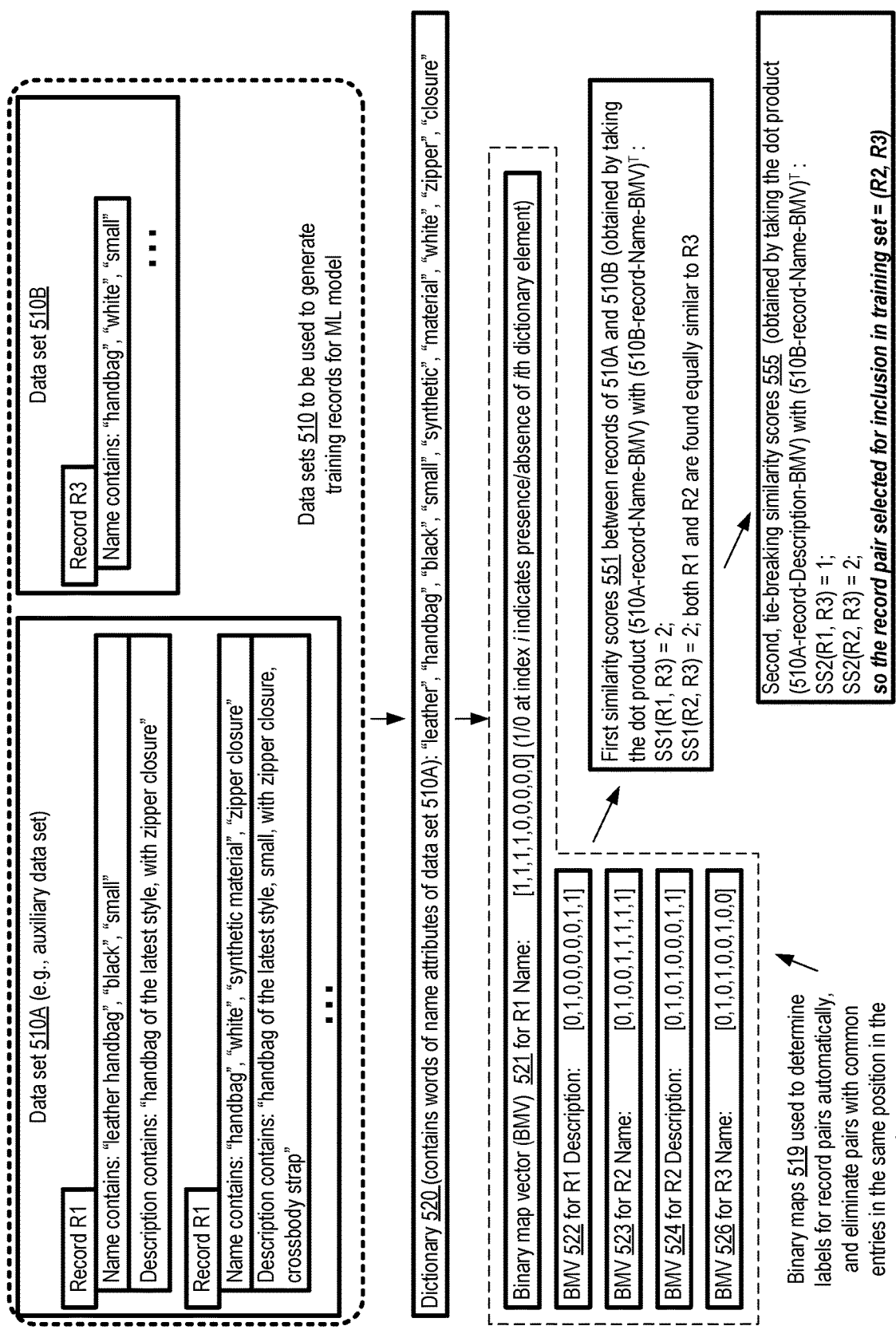
FIG. 5 illustrates a simple example of the use of binary maps during the automated generation of training examples for a machine learning model, according to at least some embodiments.

FIG. 5 illustrates a simple example of the use of binary maps during the automated generation of training examples for a machine learning model, according to at least some embodiments. The example show how a dictionary and binary maps may be created based on text tokens in a few attributes of records of two data sets 510A and 510B which are used together to generate record pairs of a training data set. To keep the presentation simple while illustrating the concepts involved, only three records are considered; in practice, of course, large numbers of records from source data sets 510 may be used to prepare training data sets, and each of the records may contain many more attributes.

The data sets 510 may correspond to a TLC such as "handbags" of entities represented in an e-retail web site's catalogs in the depicted example. Data set 510A comprises records R1 and R2, while data set 510B comprises record R3. Data set 510A may, for example, be obtained from a TLC-specific (for the "handbags" TLC) auxiliary data source of the kind discussed earlier, while data set 510B may contain records from a target collection of records for relationship analysis, or contributor records which are processed/cleansed to obtain the target collection. Text tokens that are present in attributes "Name" are listed for all three records R1, R2 and R3; text tokens which are present in a "Description" attribute are also for R1 and R2.

A dictionary 520 is generated from the tokens in the "Name" attribute of data set 510A. The dictionary 520 comprises a list of all the distinct tokens: "leather", "handbag", "black", "small", "synthetic", "material", "while", "zipper", and "closure". The entries of the dictionary may each have an associated index indicating the position of the entry within the dictionary: "leather" may have the index value 0, "handbag" the index value 1, and so on. In some implementations the dictionary entries may be alphabetically sorted; in other implementations, the dictionary entries may not be sorted. Any of a variety of data structures, such as the dictionary data structures of the Python or Java programming languages, may be used for a dictionary similar to 520 in different embodiments.

For each of the attributes of the records of data sets 510A and 510B, a respective binary map vector (BMV) may be generated in the depicted embodiment. The length of the BMV may be set equal to the number of entries of the dictionary in the depicted implementation. Each entry of a given BMV may be set to either 0 or 1; 0 if the corresponding dictionary entry is absent in the attribute value, and 1 if the corresponding dictionary entry is present. Thus, for example, MMV 521 for R1's Name attribute is set to [1, 1, 1, 1, 0, 0, 0, 0, 0] because the first four entries of the dictionary ("leather", "handbag", "black", and "small") are present in R1's Name, and the remaining entries of the dictionary are absent from R1's Name. Similarly, BMVs 522, 523, 524 and 525 may be constructed for R1's Description attribute, R2's Name attribute, R2's Description attribute, and R3's Name attribute.

In the depicted example scenario, one of the assumed objectives is to identify record pairs for inclusion in the training data set for a machine learning model, such that a record of data set 510B is paired with the single most similar record in data set 510A. A first set of similarity scores (SS1s) 551 is computed by obtaining the dot product of the Name BMV of the 510A record and the transverse of the Name BMV of the 510B record. SS1(R1, R3) (the similarity score between R1 and R3 using the first similarity score computation technique) is found to be equal to 2, which is also the value of SS1 (R2, R3); that is, both records of data set 510A are found to be equally similar to R3 based on the first similarity score computations.

In order to break this tie (e.g., if it is desired that only one record pair with R3 is to be included in the training data), a second similarity score SS2 555 may be computed for the record pairs in the depicted example scenario. SS2 is obtained as the dot product of the 510 record's Description BMV and the transverse of the Name BMV of the 510B record. This time, the two similarity scores differ, with SS2(R2, R3) being higher than SS2(R1,R3). Consequently, (R2, R3) may be included in the training data set being constructed from data sets 510A and 510B, while (R1, R3) may be excluded. Note that other types of dictionary generation techniques, other types of similarity score (or relationship score) computations and/or tie-breaking techniques may be used in different embodiments.

Example Sources of Training Candidate Record Pairs

Figure 6:
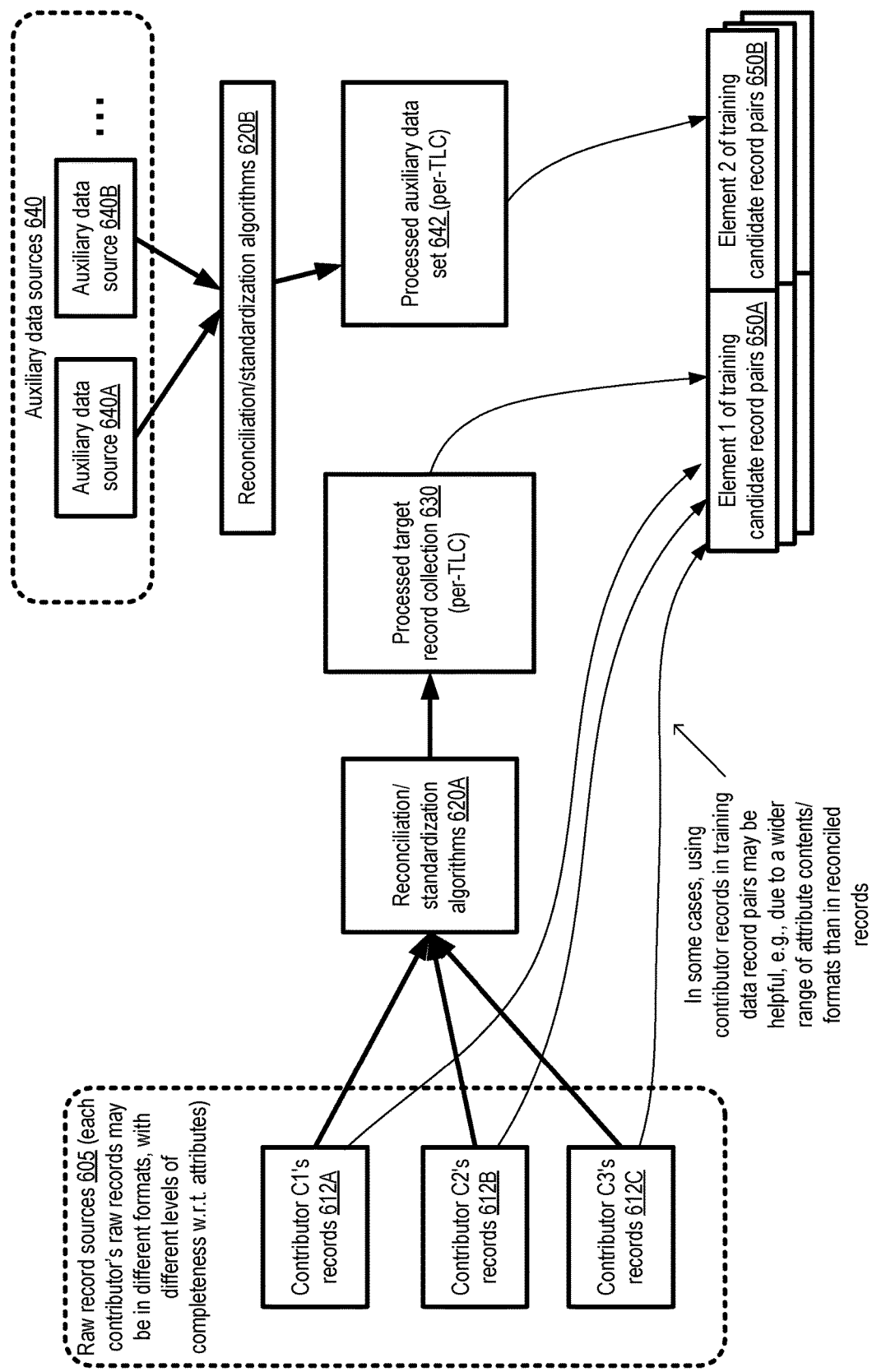
FIG. 6 illustrates example sources of training candidate record pairs, according to at least some embodiments.

FIG. 6 illustrates example sources of training candidate record pairs, according to at least some embodiments. A number of different raw data record sources 605 may be used to generate a target collection of records for which relationship analysis is to be performed in the depicted embodiment. The raw data records may be obtained at an analytics service similar in features and functionality to service 102 of FIG. 1 from a variety of contributors, e.g., including one or more contributors specified by a client of the analytics service via programmatic interfaces. In at least some embodiments, contributor C1's records 612A, contributor C2's records 612B, and contributor C3's records 613A, may each be provided in slightly different formats, and/or may have different average levels of completeness or correctness—e.g., some records may use alternate spellings or abbreviations which are not used consistently across the entire set of contributor records. One or more reconciliation/standardization algorithms 620A may be used to transform the raw contributor records into a reformatted, cleansed, processed target record collection 630.

Auxiliary or non-target records, which may be employed for training set generation but for which relationship analysis requests are not expected at the analytics service, may also be obtained from a variety of auxiliary data sources 640, such as 640A and 640B in the depicted embodiment. One or more reconciliation/standardization algorithms 620B may also be applied to such auxiliary records in some embodiments, resulting in a processed auxiliary data set 642. In some embodiments, depending on how different the auxiliary records in general are relative to the raw contributor records, a different set of algorithms may be used to standardize the auxiliary data than was used for standardizing the raw data sets used as a source for the target collection.

As indicated earlier, the training data set which is automatically generated at the analytics service may comprise numerous record pairs in various embodiments. As shown in FIG. 6, one record (Element 2 or 650B) of each candidate record pair for the training data set may be obtained from the auxiliary data set 642 in at least some embodiments, while the other record (Element 1 or 650A) may be obtained from the target record collection. In at least one embodiment, instead of using processed target records, at least some of the underlying contributor records 612 may be used as one of the elements of the candidate record pairs. Using the contributor records may, for example, be helpful due to the contributor records providing a wider range of attribute content formats than may be available from the standardized or processed target record collections 630, and hence may enable a more general machine learning model to be trained. In some embodiments, unprocessed auxiliary data records (i.e., records which have not yet been processed via at least some of the algorithms 720B) may also be used as elements of the candidate record pairs. As mentioned earlier, the candidate pairs for inclusion on a training data set may be selected and analyzed on a per-TLC basis in various embodiments.

Example Neural-Network Based Model

Figure 7:
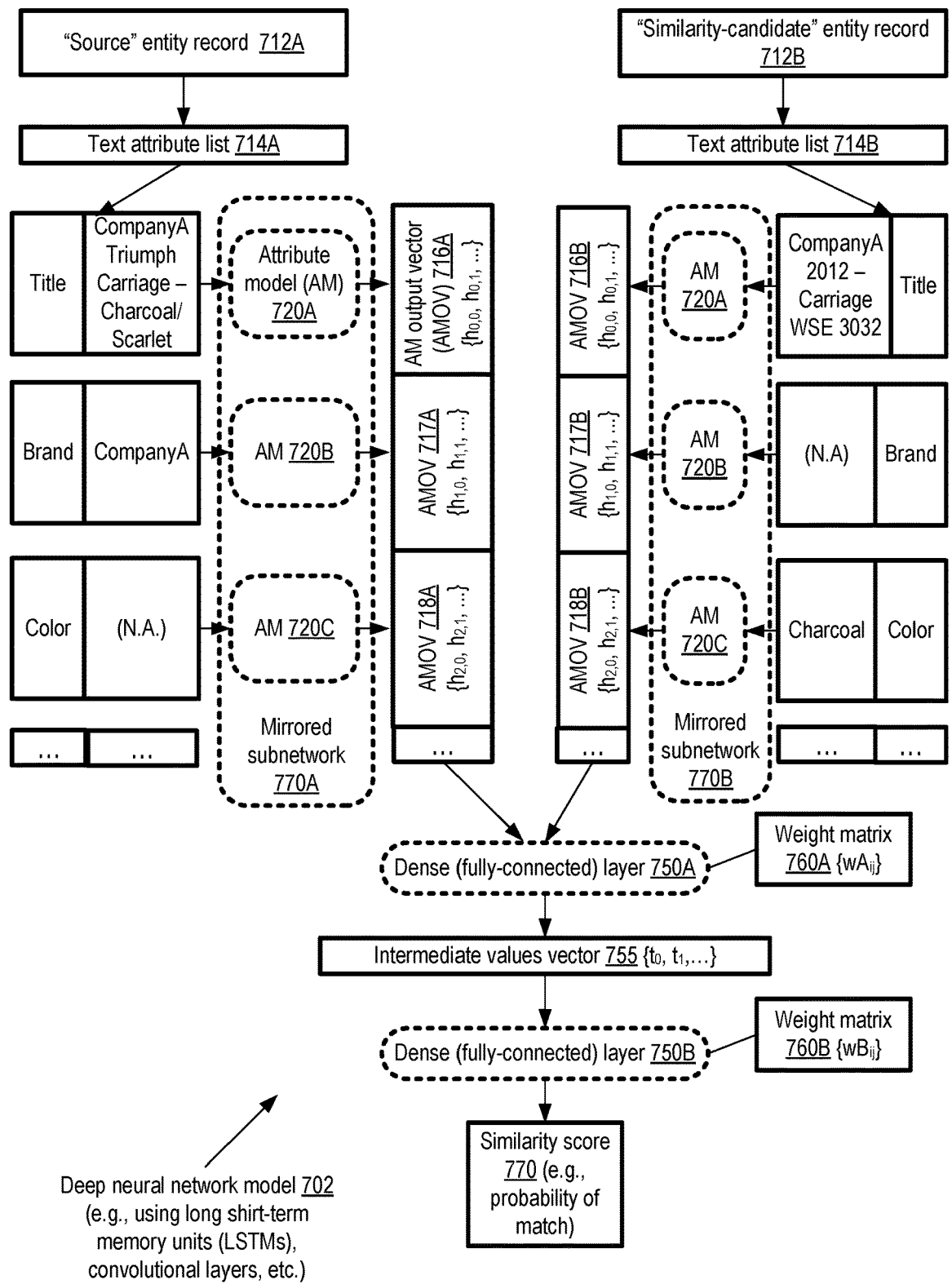
FIG. 7 illustrates an example symmetric neural network based machine learning model for relationship analysis, which may be trained using automatically-labeled record pairs, according to at least some embodiments.

A variety of machine learning algorithms and models may be trained with the help of automatically labeled training data sets in different embodiments. FIG. 7 illustrates an example symmetric neural network based machine learning model for relationship analysis, which may be trained using automatically-labeled record pairs, according to at least some embodiments. Model 702 may comprise a plurality of logical layers or sub-models in the depicted embodiment, including at least an attribute model layer (in which learning occurs at the level of individual attributes of record pairs) and a token model layer (in which learning occurs at the level of individual text or other tokens within attributes). In the depicted embodiment, mirrored subnetworks 770A and 770B at the attribute model layer of deep neural network model 702 are shown. The attribute model layer subnetworks may comprise respective token model layer subnetworks which are also mirrored; the token model details are not shown in the overview depicted in FIG. 7.

In the depicted embodiment, the model 702 is to be trained to generate respective similarity scores for input record pairs, with the individual records of a given pair being provided as input to a respective subnetwork 770. Such input record pairs may each comprise a source entity record such as 712A and a corresponding similarity-candidate entity record 712B, each comprising a respective set or list of text attributes (e.g., list 714A of source entity record 712A, and list 714B of similarity-candidate entity record 712B). The types of attributes included in lists 714A and 714B are assumed to be identical in the depicted scenario, although in at least one embodiment one of the entity records may have a different list of attributes than the other. Three examples of attribute types are shown by way of example in FIG. 7: a "Title" attribute, a "Brand" attribute, and a "Color" attribute.

The source and similarity-candidate entity records in the depicted example refer to the same top-level class of underlying item of a catalog: a baby carriage or stroller. The "Title" attribute of entity record 712A comprises the text "CompanyA Triumph Carriage—Charcoal/Scarlet", while the "Title" of entity record 712B is set to "CompanyA 2012—Carriage WSE 3032". The "Brand" attribute of descriptor 712A comprises the text "CompanyA", while the "Brand" attribute of descriptor 712B is empty (as indicated by the label "N.A" or "not available"). The Color attribute of descriptor 712A is empty, while the Color attribute of descriptor 712B comprises the text "Charcoal" in the depicted example.

The raw text of the attributes may be processed and converted into a set of intermediate vectors by a token model layer (not shown in FIG. 7) in the depicted embodiment, which are then consumed as input by nodes of respective mirrored instances of attribute model subnetworks 720 (e.g., 720A, 720B, 720C, and so on). Individual ones of the attribute model subnetworks 720 may comprise a plurality of nodes, including for example LSTM units and/or CNN layers in at least some embodiments. Corresponding to a given attribute's value, an attribute model output vector (AMOV) may be generated in the depicted embodiment. For example, AMOVs 716A and 716B (each comprising a respective vector of real numbers $h_{0,0}$, $h_{0,1}$, . . . ) may be produced from the "Title" attributes of records 712A and 712B, AMOVs 717A and 717B may be generated from the "Brand" attributes, AMOVs 718A and 718B may be generated from the Color attributes, and so on.

In at least some embodiments, the AMOVs may be combined (e.g., by concatenation) and provided as input to a first dense or dully-connected layer 750A of the deep neural network 702, for which a first weight matrix 760A may be learned during training of model 702. The output of the first dense layer 750A may comprise another intermediate values vector 755 in the depicted embodiment, which may in turn comprise the input to a second dense layer 750B with associated weight matrix 760B. The output of the second dense layer 750B may comprise the similarity score 770 (e.g., a real number or integer indicating the probability that the items represented by entity records 712A and 712B are the same items) in the depicted embodiment.

In some embodiments, for example to avoid overfitting, a dropout technique may be employed at one or more layers of a deep neural network model 702, whereby randomly selected neurons or nodes of the model are ignored during training. A dropout parameter may represent the probability than a given node is to be ignored or "dropped out" in such embodiments, and may be included in the set of hyperparameters for which values may be identified before a given training iteration of the model. If a node is dropped out, in some embodiments its contribution to the activation of downstream nodes may be at least temporarily removed on the forward pass, and/or weight updates may not be applied to the node on the backward pass.

In at least one embodiment, a neural networks library (similar to the Keras library) may be employed to implement portions or all of the deep neural network model 702. Any of a variety of programming languages such as Python, Java™, Scala or the like may be used for the neural network model in different embodiments, and the model may be trained and executed using a variety of execution resources such as one or more physical or virtual machines. In at least some embodiments, machine learning models which do not include neural networks, such as decision-tree based models, may be trained using automatically labeled training data obtained using the techniques introduced earlier.

Example Programmatic Interactions

Figure 8:
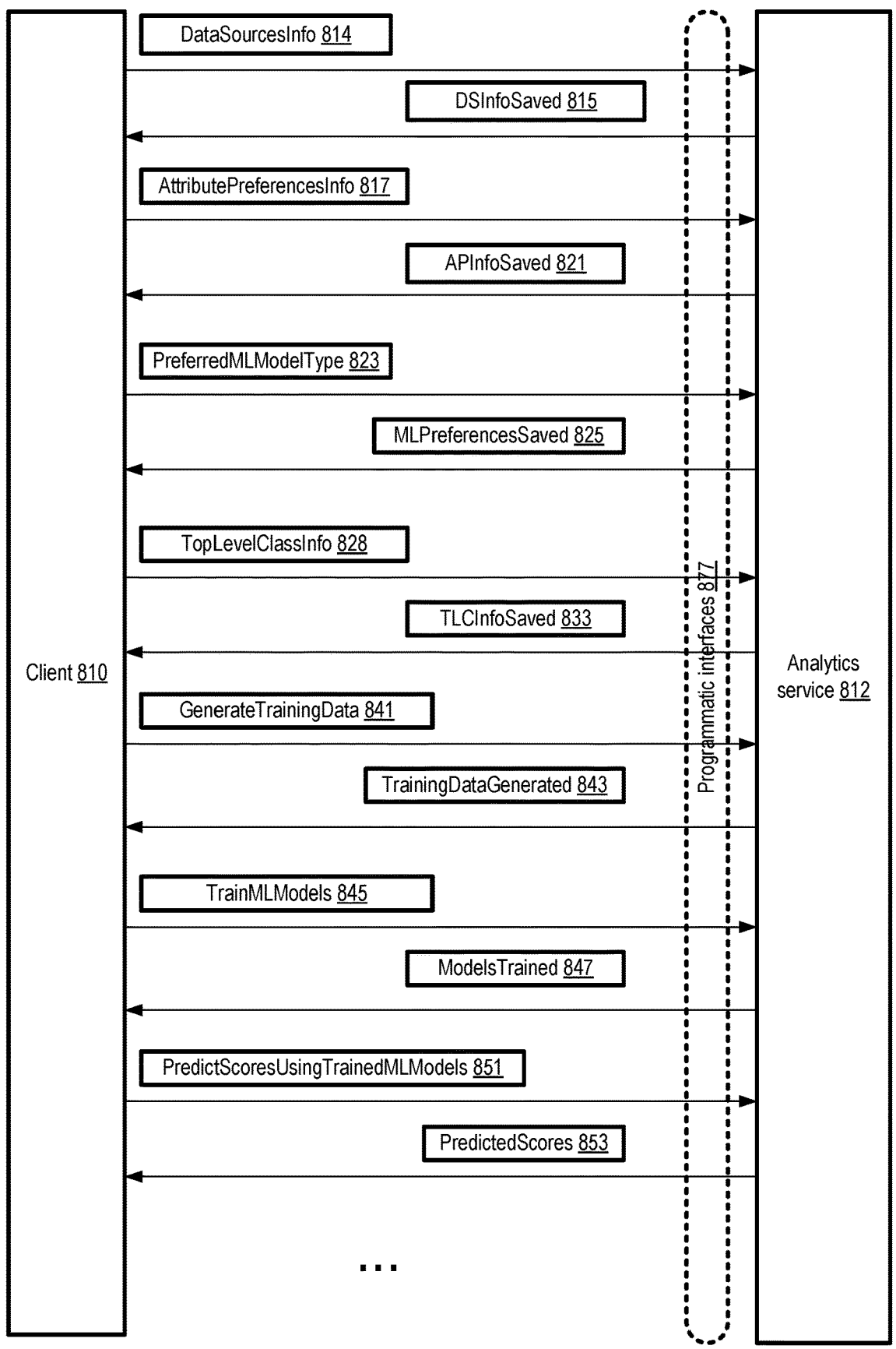
FIG. 8 illustrates example programmatic interactions between a client and an analytics service, according to at least some embodiments.

FIG. 8 illustrates example programmatic interactions between a client and an analytics service, according to at least some embodiments. An analytics service 812, similar in features and functionality to analytics service 102 of FIG. 1, may implement one or more sets of programmatic interfaces 877 in the depicted embodiment, such as various types of web-based interfaces or consoles, APIs, command-line tools, graphical user interfaces, and the like.

Using the interfaces 877, a client 810 of the analytics service 812 may submit a DataSourcesInfo message 814, indicating one or more data sources from which records can be obtained for relationship analysis. Data source of various types may be indicated in message 814, e.g., including raw contributor record sources, processed target record sources, auxiliary data sources, and so on. The analytics service may store the provided information, and send a DSInfoSaved message 815 to the client indicating that the information has been saved.

In some embodiments, a client 810 may send an AttributePreferencesInfo message 817 indicating which specific attributes are to be used to generate the training data sets, which attributes are to be used (and in what order) to break ties in relationship scores (e.g., for the kinds of tie-breaking techniques discussed in the context of FIG. 5), and so on. The analytics service may send an APInfoSaved message 821 in response to message 817, indicating that the attribute preference information has been saved.

A client 810 may indicate the kind of machine learning model which is to be trained for relationship analysis via a PreferredMLModelType message 823 in some embodiments. For example, the client could indicate that a mirrored neural network-based model similar to that shown in FIG. 7 should preferably be trained, or a model that does not rely on neural networks should instead be trained, and so on. The client may specify additional levels of detail regarding the desired model in different embodiments: e.g., the client could indicate whether LSTMs or CNN layers are to be used, the particular error or loss metric to be used to train the model, and so on. The preferences of the client with respect to the machine learning model may be saved in the depicted embodiment, and an MLPreferencesSaved response message 825 may be sent to the client.

In at least some embodiments, a client 810 may provide the list of top-level classes (TLCs) for which respective subsets of the target record collection are to be identified, and for which respective machine learning models are to be trained using auto-generated training data, via a TopLevelClassesInfo message 828. In at least one embodiment, the client may also provide indications of one or more auxiliary data sources for at least some of the TLCs. In one embodiment, the client 810 may provide an indication of an algorithm for classifying a target collection of records (and/or an auxiliary data set) into TLCs—e.g., keywords or particular attributes to be used for the classification may be indicated, or a simple classifier model may be provided/indicated by the client. The provided information about the TLCs may be stored at the analytics service 812, and a TLCInfoSaved message 833 may be sent to the client in at least one embodiment.

A client 810 may submit a GenerateTrainingData request 841 in some embodiments, indicating for example a particular target collection of records and the type of relationship analysis which is desired (e.g., similarity analysis, membership/inclusion analysis, participation analysis, and so on). In response, candidate training record pairs may be identified in various embodiments, and techniques similar to those discussed earlier (e.g., in the context of FIG. 4) may be used to generate training data sets for one or more TLCs in various embodiments. After the training data has been identified, a TraingDataGenerated response message 843 may be sent to the client in some embodiments. In at least one embodiment, a desired target minimum or maximum size of the training data set for one or more of the TLCs may be indicated in the request 841, and a training data set meeting the specified size criteria may be prepared if possible at the analytics service.

In the embodiment depicted in FIG. 8, one or more TrainMLModels requests 845 may be submitted by a client to request or trigger the training of TLC-specific models. In other embodiments, a client 810 may not have to submit separate requests to generate the training data (e.g., request 841) and then to train the machine learning model(s) using the generated training data (e.g., request 845); instead, a single request to train model(s) for relationship analysis may be sufficient to cause the analytics service 812 to generate training data and train the models. After the model(s) have been trained, a ModelsTrained message 847 may be sent to the client in some embodiments to verify that trained version(s) of the model(s) have been generated and stored.

Clients may submit requests to execute the trained models, such as PredictScoresUsingTrainedMLModels request 851, in various embodiments. Such requests may indicate, for example, a first set of one or more records for which relationship analysis of a desired type is to be performed with respect to a second set of one or more records, and corresponding relationship scores (such as similarity scores) are to be provided. The set of predicted scores for the targeted records may be obtained using the trained versions of the models, and provided to the client (and/or to one or more downstream programs, which may be indicated in the request 851) by the analytics service via PredictedScores message(s) 853. In at least one embodiment, when requesting the execution of the trained models, a client may optionally indicate the specific TLC of the records for which a relationship prediction is requested; this may help the analytics service select the particular TLC-specific model to be run to respond to the request. In other embodiments, the analytics service may be responsible for determining, e.g., using similar approaches as were used to identify TLC-specific subsets of the collections, which particular TLC-specific model or models should be run. In one embodiment, e.g., in a scenario in which the TLC for which a model is to be run is unclear, the analytics service may utilize multiple TLC-specific models to provide the predicted scores.

In some embodiments, programmatic interactions other than those shown in FIG. 8 may be supported by an analytics service 812.

Example Provider Network Environment

Figure 9:
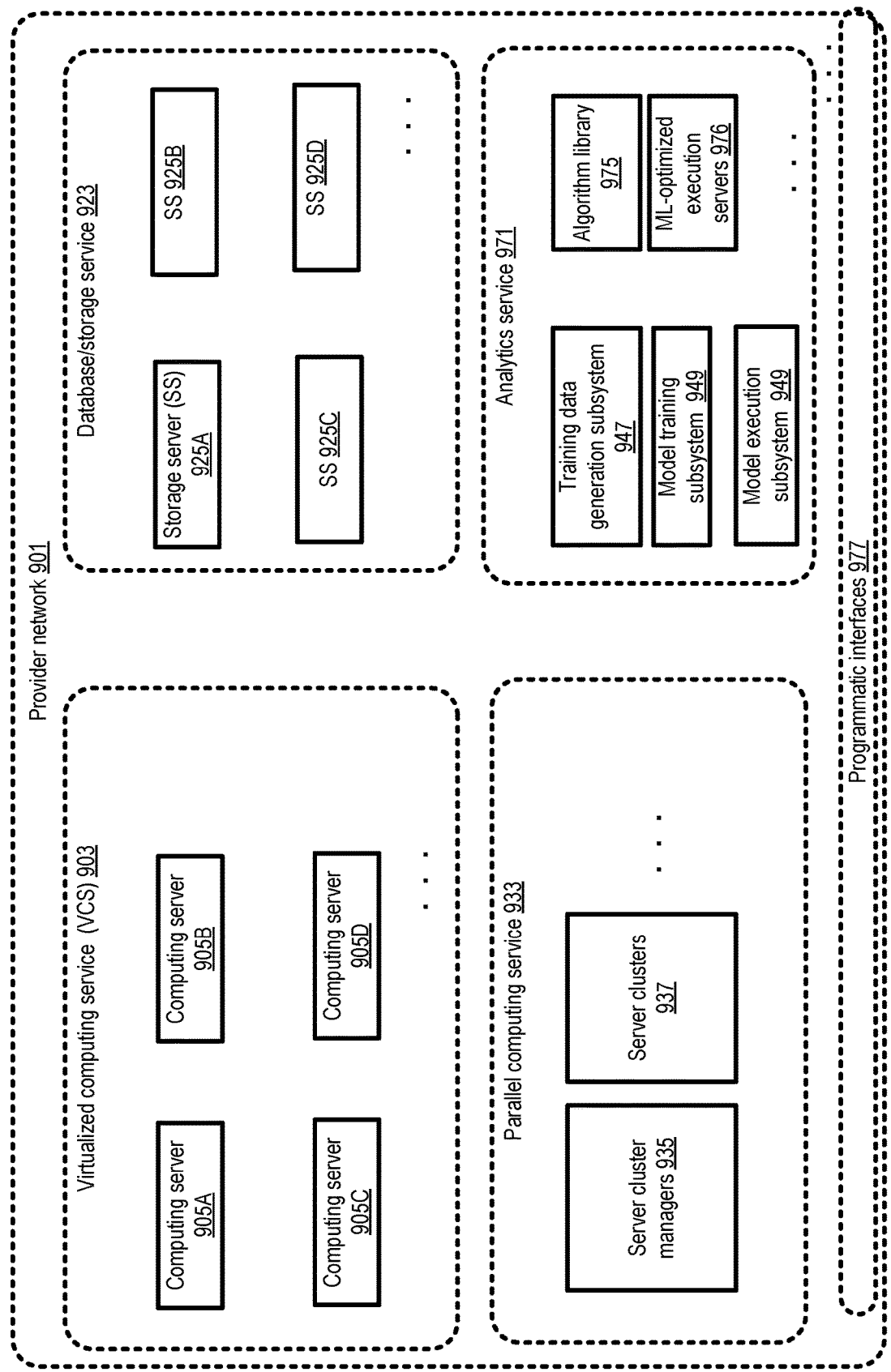
FIG. 9 illustrates an example provider network environment in which an analytics service may be implemented, according to at least some embodiments.

FIG. 9 illustrates an example provider network environment in which an analytics service may be implemented, according to at least some embodiments. Networks set up by an entity such as a company or a public sector organization to provide one or more network-accessible services (such as various types of cloud-based computing, storage or analytics services) accessible via the Internet and/or other networks to a distributed set of clients may be termed provider networks in various embodiments. A provider network may sometimes be referred to as a "public cloud" environment (or simply as a "cloud"), which indicates a large pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. The resources of at least some services of a provider network may in some cases be distributed across multiple data centers, which in turn may be distributed among numerous geographical regions (e.g., with each region corresponding to one or more cities, states or countries). For example, a cloud provider network can be formed as a number of regions, where a region is a geographical area in which the cloud provider clusters data centers. Each region can include two or more availability zones connected to one another via a private high speed network, for example a fiber communication connection. An availability zone refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network, etc.).

In the depicted embodiment, provider network 901 may comprise resources used to implement a plurality of services, including for example a virtualized computing service (VCS) 903, a database/storage service 923, a parallel computing service 933 as well as an analytics service 971 similar in features and capabilities to analytics service 102 of FIG. 1. The analytics service 971 in turn may comprise a training data generation subsystem 947, a model training subsystem 948, a model execution subsystem 949, and an algorithm library 975 in various embodiments. The analytics service 971 may also be referred to as a machine learning service or an artificial intelligence service. In one embodiment, the analytics service may comprise a set of machine-learning-optimized execution servers 976, which may be utilized for training and/or running relationship analysis models similar to those discussed earlier. The parallel computing service 933 may comprise various server clusters 937, each comprising a plurality of servers, on which parallelizable workloads (which may include the parallel training or execution of multiple TLC-specific machine learning models) may be distributed by a set of server cluster managers 935 in the depicted embodiment.

Components of a given service may utilize components of other services in the depicted embodiment—e.g., for some analytics service tasks, virtual machines implemented at computing servers such as 905A-905D of the virtualized computing service 903 may be used, target data sets and/or auxiliary data sets as well as candidate record pairs of the training data sets may be stored at storage servers 925 (e.g., 925A-925D) of storage service 923, and so on. Individual ones of the services shown in FIG. 9 may implement a respective set of programmatic interfaces 977 which can be used by external and/or internal clients (where the internal clients may comprise components of other services) in the depicted embodiment.

In some embodiments, at least some aspects of the techniques described above for unsupervised preparation of training data and the training/execution of models using such automatically generated training data may be implemented without acquiring resources of network-accessible services such as those shown in FIG. 8. For example, a standalone tool implemented at one or more computing devices which are not part of a network-accessible service may be used in some embodiments.

Use Cases

The techniques described above, of automating the preparation of training data sets and then using the training data sets to automatically train machine learning models may be extremely useful in numerous scenarios. For example, the inventories of many retailers, including Internet-based retailers, may often include large numbers of items, with some items being produced or provided by other vendors and sold through the retailers' web sites. If multiple descriptions are provided by different information sources for the same underlying item, and included in a retailer's web site, this may lead to customer confusion and, potentially, to reduced sales. In order to prevent such problems, sophisticated machine learning models may have to be trained, which may require large amounts of labeled training data. Labeling training data on a per-class basis automatically, as proposed, using auxiliary sources of information, may speed up model preparation substantially.

Illustrative Computer System

Figure 10:
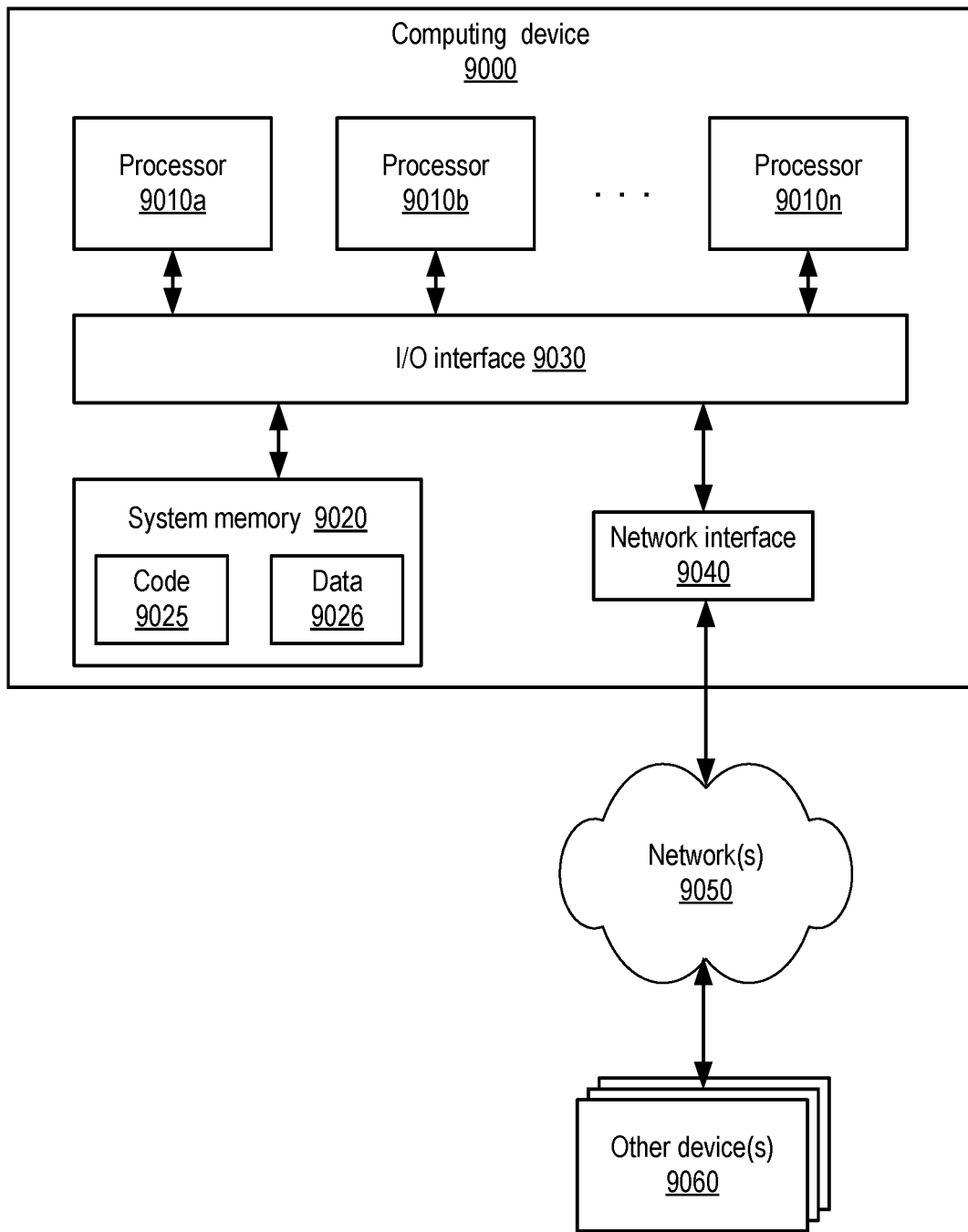
FIG. 10 is a block diagram illustrating an example computing device that may be used in at least some embodiments.

In at least some embodiments, a server that implements one or more of the types of techniques described herein (e.g., automatically generating training data, using the generated training data to train machine learning models, and running the machine learning models) may include a general-purpose computer system that includes or is configured to access one or more computer-accessible media. FIG. 10 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 9, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 9. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 10 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices;
wherein the one or more computing devices include instructions that upon execution on or across one or more processors cause the one or more computing devices to:
determine that similarity analysis is to be performed with respect to a target collection of records, wherein individual ones of the records of the target collection comprise respective values of one or more attributes of an entity;
classify the target collection of records into a plurality of subsets, wherein individual ones of the subsets represent a respective top-level class of a set of top-level classes; and
with respect to at least a particular top-level class of the set:
obtain an indication, via a programmatic interface, of one or more additional data sources for entities of the particular top-level class;
automatically generate, using the one or more additional data sources and an entity-pair comparison algorithm which does not utilize machine learning, respective labels for a plurality of record pairs of a training data set to be used to train a supervised machine learning model for similarity detection, wherein individual ones of the record pairs of the training data set include a respective record obtained from the one or more additional data sources;
train, using the training data set, a supervised machine learning model for similarity analysis with respect to records of entities belonging to the particular top-level class, wherein the supervised machine learning model comprises one or more neural networks;
store a trained version of the supervised machine learning model; and
identify, using the trained version, one or more pairs of records which satisfy a similarity criterion, wherein individual ones of the identified pairs include at least one record of the target collection.

2. The system as recited in claim 1, wherein the one or more computing devices include further instructions that upon execution on or across the one or more processors further cause the one or more computing devices to:
identify, with respect to the particular top-level class, a plurality of candidate record pairs to be considered for inclusion in the training data set; and
exclude, from the training data set for the particular to-level class, at least one candidate record pair based on a result obtained via the entity-pair comparison algorithm.

3. The system as recited in claim 1, wherein the one or more computing devices include further instructions that upon execution on or across the one or more processors further cause the one or more computing devices to:
generate, to implement the entity pair comparison algorithm, at least a first binary map corresponding to a first record of a record pair of the plurality of record pairs, and at least a second binary map corresponding to a second record of the record pair, wherein the first binary map indicates the presence of one or more text tokens in the entity attributes of the first record, and wherein the second binary map indicates the presence of one or more text tokens in the entity attributes of the second record.

4. The system as recited in claim 1, wherein the one or more computing devices include further instructions that upon execution on or across the one or more processors further cause the one or more computing devices to:
obtain, via a programmatic interface, a request to train one or more machine learning models for relationship analysis, wherein the respective labels are generated in response to the request.

5. The system as recited in claim 1, wherein the one or more computing devices include further instructions that upon execution on or across the one or more processors further cause the one or more computing devices to:
obtain, via one or more programmatic interfaces, respective indications of one or more of (a) the plurality of top-level classes or (b) an algorithm for classifying the target collection into the plurality of subsets.

6. A method, comprising:
performing, at one or more computing devices;
classifying a collection of records for which relationship analysis is to be performed into a plurality of subsets, wherein individual ones of the subsets correspond to a respective top-level class of a set of top-level classes, and wherein individual ones of the records of the collection comprise respective values of one or more attributes of an entity; and
with respect to one or more of the top-level classes:
generating, using (a) one or more data sources corresponding to the top-level class and (b) an entity-pair comparison algorithm, respective labels for a plurality of record pairs of a training data set for a machine learning model;
training, using the training data set, a machine learning model for relationship analysis with respect to records of entities belonging to the top-level class; and
storing a trained version of the machine learning model.

7. The method as recited in claim 6, wherein the plurality of record pairs comprises a particular record pair, wherein one record of the particular record pair is obtained at least in part from the one or more data sources, and wherein the other record of the particular record pair is a record belonging to the target collection.

8. The method as recited in claim 6, further comprising performing, at the one or more computing devices:
implementing the entity-pair comparison algorithm, wherein said implementing comprises:
generating at least a first binary map corresponding to a first record of a record pair, and at least a second binary map corresponding to a second record of the record pair, wherein the first binary map indicates the presence of one or more text tokens in the entity attributes of the first record, and wherein the second binary map indicates the presence of one or more text tokens in the entity attributes of the second record; and
obtain a similarity metric for the first and second records using the first and second binary maps.

9. The method as recited in claim 6, further comprising performing, at the one or more computing devices:
obtaining, via one or more programmatic interfaces, respective indications of (a) the plurality of top-level classes and (b) an algorithm for said classifying.

10. The method as recited in claim 6, further comprising performing, at the one or more computing devices:
obtaining, via one or more programmatic interfaces, an indication of a target size of the training data set to be generated for at least the particular top-level class.

11. The method as recited in claim 6, further comprising performing, at the one or more computing devices:
selecting, from a source group of records which are not obtained from the one or more additional data sources, one or more records to be included in the plurality of record pairs for which labels are generated automatically, wherein said selecting is based at least in part on one or more of: (a) random sampling, (b) attribute range coverage analysis, or (c) one or more metrics indicative of record incompleteness.

12. The method as recited in claim 6, wherein said generating the respective labels comprises:
obtaining, using the one or more additional data sources, a first group of records representing entities of the particular top-level class; and
obtaining a respective result of the entity pair comparison algorithm with respect to individual ones of a collection of record pairs, wherein individual ones of the collection of record pairs include exactly one record of the first group, wherein the respective result indicates one of: (a) that the records of the record pair meet a high-similarity criterion, (b) that the records of the record pair meet a high-dissimilarity criterion, or (c) that the records of the record pair meet neither the high-similarity criterion nor the high-dissimilarity criterion; and
including, in the training data set, at least one record pair which meets the high-similarity criterion, and at least one record pair which meets the high-dissimilarity criterion.

13. The method as recited in claim 6, wherein the machine learning model comprises one or more of: (a) one or more long-short-term-memory (LSTM) units or (b) one or more convolutional neural networks.

14. The method as recited in claim 6, further comprising performing, at the one or more computing devices:
obtaining, via a programmatic interface of a network-accessible service of a provider network, a request to generate the training data set with respect to one or more top-level classes including the particular top-level class, wherein the respective labels are generated in response to the request.

15. The method as recited in claim 6, further comprising performing, at the one or more computing devices:
implementing, prior to said classifying, a record reconciliation algorithm on a plurality of received contributor records to obtain a particular record of the target collection; and
including, in a record pair of the plurality of record pairs for which respective labels are automatically generated, a received contributor record.

16. One or more non-transitory computer-accessible storage media storing program instructions that when executed on or across one or more processors cause one or more computer systems to:
automatically generate, using (a) one or more data sources corresponding to respective ones of a plurality of classes and (b) an entity-pair comparison algorithm, respective labels for a plurality of record pairs, wherein individual ones of the records of the record pairs comprise values of one or more attributes of an entity, and wherein a label generated for a particular record pair indicates a relationship detected between the records of the pair;

train, using the plurality of labeled record pairs, one or more machine learning models to predict relationships between records belonging to the respective classes; and store trained versions of the one or more machine learning models.

17. The one or more non-transitory computer-accessible storage media as recited in claim 16, storing further program instructions that when executed on or across the one or more processors further cause one or more computer systems to:

identify the plurality of classes of records for which relationship analysis is to be performed, wherein the one or more machine learning models include a first machine learning model and a second machine learning model, wherein the first machine learning model is trained to predict relationships among pairs of records belonging to a first class of the plurality of classes, and wherein the second machine learning model is trained to predict relationships among pairs of records belonging to a second class of the plurality of classes.

18. The one or more non-transitory computer-accessible storage media as recited in claim 16, wherein the one or more machine learning models include at least one decision tree model.

19. The one or more non-transitory computer-accessible storage media as recited in claim 16, a label generated automatically for a particular record pair indicates one or more of: (a) a similarity between the records of the pair, (b) a difference between the records of the pair, (c) an inclusion relationship between the records of the pair or (d) a participation relationship between the records of the pair.

20. The one or more non-transitory computer-accessible storage media as recited in claim 16, storing further program instructions that when executed on or across the one or more processors further cause one or more computer systems to:

obtain, via a programmatic interface, an indication of at least one data source from which a record to be included in at least one record pair of the plurality of record pairs is to be obtained.

* * * * *